Aug. 19, 1952   P. T. HAHN   2,607,069
AGITATOR MOUNTING FOR SUCTION CLEANERS
Filed April 23, 1945   5 Sheets-Sheet 1
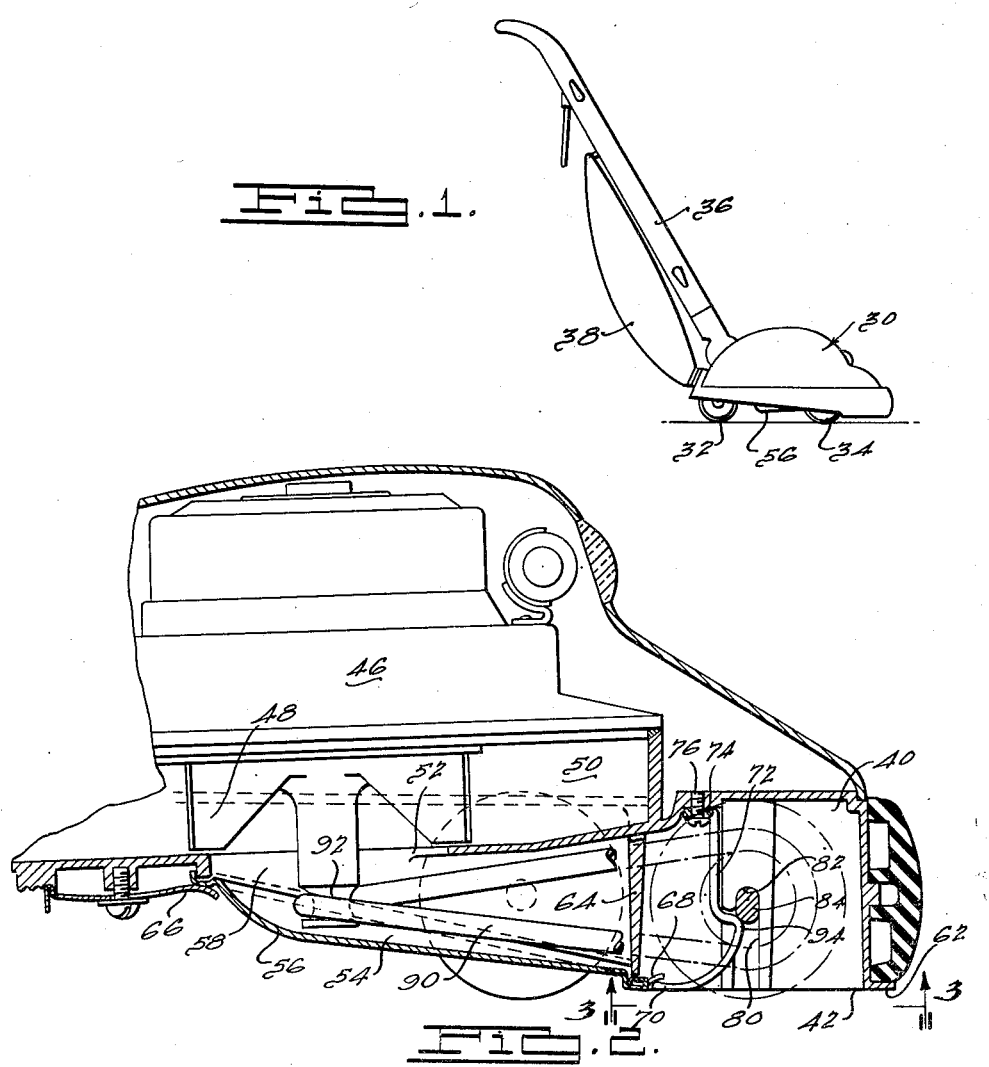
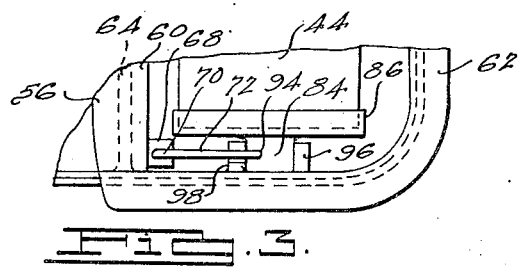
INVENTOR.
Paul T. Hahn.
BY
Edwin J. Balluff
ATTORNEY.

Aug. 19, 1952     P. T. HAHN     2,607,069
AGITATOR MOUNTING FOR SUCTION CLEANERS
Filed April 23, 1945     5 Sheets-Sheet 2

INVENTOR.
Paul T. Hahn.
BY
Edwin J. Balluff
ATTORNEY

Aug. 19, 1952 P. T. HAHN 2,607,069
AGITATOR MOUNTING FOR SUCTION CLEANERS
Filed April 23, 1945 5 Sheets-Sheet 3

INVENTOR.
Paul T. Hahn.
BY
Edwin J. Balluff
ATTORNEY.

Aug. 19, 1952 P. T. HAHN 2,607,069
AGITATOR MOUNTING FOR SUCTION CLEANERS
Filed April 23, 1945 5 Sheets-Sheet 4
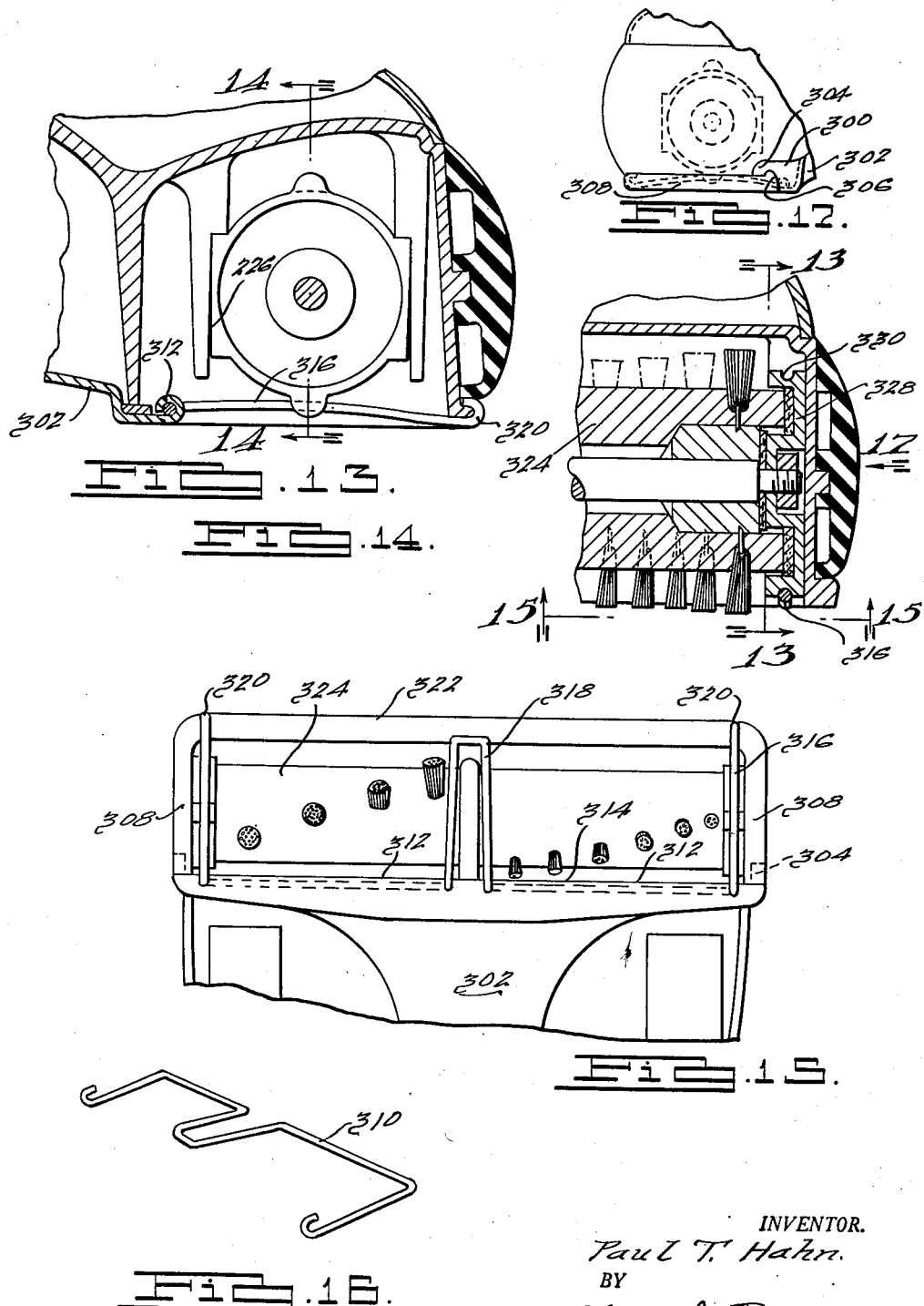
INVENTOR.
Paul T. Hahn.
BY
Edwin J. Balluff
ATTORNEY.

Aug. 19, 1952 P. T. HAHN 2,607,069
AGITATOR MOUNTING FOR SUCTION CLEANERS
Filed April 23, 1945 5 Sheets-Sheet 5

INVENTOR.
Paul T. Hahn.
BY
Edwin J. Balluff
ATTORNEY.

Patented Aug. 19, 1952

2,607,069

UNITED STATES PATENT OFFICE 2,607,069

AGITATOR MOUNTING FOR SUCTION CLEANERS

Paul T. Hahn, Detroit, Mich., assignor to Eureka Williams Corporation, a corporation of Michigan Application April 23, 1945, Serial No. 589,747

6 Claims. (Cl. 15—391)

This invention relates to suction cleaners and has particular reference to certain new and useful improvements relating to the agitator bearings and thread guards and means for securing the same and the agitator within the nozzle of the cleaner.

Principal objects of the invention, therefore, are to provide:

A new and improved suction cleaner;

A novel and efficient bearing and thread guard for the agitator of a suction cleaner and a means for securing the same in the nozzle of the cleaner;

A novel and efficient means for securing the agitator in the nozzle of the cleaner;

A novel and efficient means for securing the bottom plate of the cleaner in position;

A new and improved form of agitator latch and belt guard.

Other and further objects of the invention will be apparent from the following description and claims and will be understood by reference to the accompanying drawings, of which there are five sheets, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a side elevational view of a cleaner embodying the invention;

Fig. 2 is an enlarged fragmentary sectional view of the cleaner illustrating certain details of the invention;

Fig. 3 is a fragmentary view taken along the line 3—3 of Fig. 2, looking in the direction of the arrows;

Fig. 13 is a view similar to Fig. 4 illustrating a further modification of the invention and taken generally along the line 13—13 of Fig. 14;

Fig. 14 is a sectional view taken along the line 14—14 of Fig. 13;

Fig. 15 is a bottom plan view of part of the cleaner taken along the line 15—15 of Fig. 14;

Fig. 16 is a perspective view of the agitator latch and belt guard;

Fig. 17 is a fragmentary side elevational view of the cleaner, looking in the direction of the arrow 17 of Fig. 14;

Figure 4:
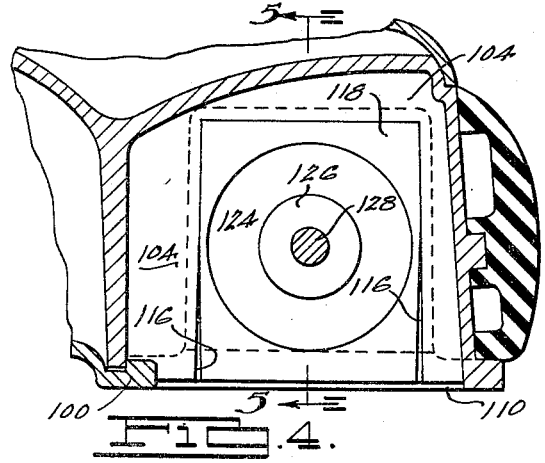
Fig. 4 is a fragmentary sectional view through the nozzle of the cleaner illustrating a modified form of the invention, and taken in a plane along the line 4—4 of Fig. 5.
Figure 5:
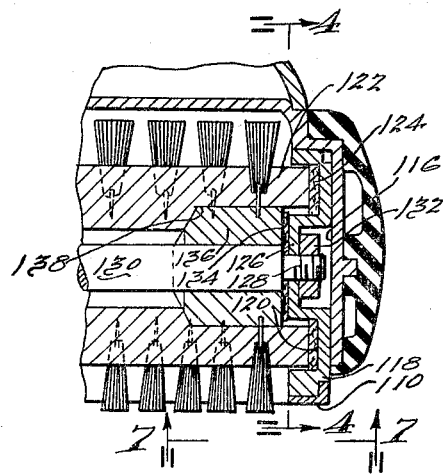
Fig. 5 is a sectional view taken along the line 5—5 of Fig. 4, looking in the direction of the arrows.

A suction cleaner embodying the invention is illustrated in Fig. 1 and comprises a body or casing 30 provided with wheels 32 and 34 for supporting the cleaner for movement on the floor, a pivoted handle 36 for maneuvering the cleaner, and a dirt collecting bag 38 operatively connected to the discharge side of the fan. As further illustrated in Figs. 2 and 3, the body or casing 30 is formed to provide a nozzle 40 having a downwardly presented mouth 42 in which an agitator or rotary brush 44 is operatively arranged. An electric motor 46 is directly connected with a fan 48 arranged in a fan chamber 50.

The fan chamber 50 is provided with an eye or air inlet opening 52 forming a communication with one end of an air conducting passage 54, the other end of which communicates with the interior of the nozzle 40 so that during operation of the fan 48 a flow of air will be induced into the nozzle 40 through the mouth thereof, through the passage 54 and the fan chamber 50, and thence through the discharge thereof to the dirt collecting bag 38. The fan chamber, nozzle, and passageway 54 may be formed at least in part by a casting.

The bottom of the passage 54 is formed by a removable bottom plate 56, such bottom plate being seated against the lower edge of a depending wall 58 to complete the passage 54. The front edge 60 of the bottom plate 56 extends across the rear of the nozzle 40 and defines the rear lip thereof which extends generally parallel to the front lip 62 of the nozzle, which in the present instance is formed integrally with the main casting. The front end 60 of the bottom plate seats against the lower edge of the rear wall 64 of the nozzle, such wall being formed integrally with the main casting and being relieved at its center so as to establish communication between the interior of the nozzle 40 and the passageway 54.

At its rear end the bottom plate 56 is detachably held against the lower edge of the wall 58 by means of a suitable latch 66. At its forward end each side of the bottom plate 56 is provided with a lug 68 forming a shoulder for engagement by one end 70 of a spring 72. Each side of the nozzle 40 is provided with a spring 72, one end 74 of which may be arranged in the form of an eye and clamped to the top wall of the nozzle 40 by means of a screw 76. Thus the two springs 72 at the sides of the nozzle 40 form resilient hooks or latches at their lower ends which engage the shoulders on the bottom plate 56 provided by the lugs 68 for removably clamping the front end of the bottom plate in position.

The margin of the bottom plate which bears against the lower edge of the wall 58 is formed in the shape of a channel and preferably provided with a gasket so as to resist lateral displacement of the bottom plate 56 and also to provide a good seal between the same and the side walls 58 of the passage 54. By displacing the latch 66 from obstructing position relative to the rear end of the bottom plate 56, the same may be pivoted in a counterclockwise direction about the front end 60 thereof and thence by rearwardly shifting the bottom plate it may be readily separated from the cleaner when the lugs 68 clear the latches 70.

The inside of each side wall of the nozzle 40 is provided with a guide 80 and seat 82 for a stub shaft 84 formed integrally with the thread guard 86. The stub shaft 84 and thread guard 86 form a bearing housing and support for the bearing (not shown) on which one end of the rotary brush or agitator 44 is rotatably journaled in the nozzle 40, the stub shaft 84 and thread guard 86 being non-rotatable when the stub shaft 84 is seated in the seat 82 as illustrated in Fig. 2. It will be observed that the stub shaft 84 is oval in cross section, as illustrated in Fig. 2.

The axis of rotation of the agitator 44 is offset vertically relative to the center of stub shaft 84 so that by removing the agitator from the nozzle and turning the stub shaft 84 one hundred eighty degrees about its own axis, the center of rotation of the agitator may be moved toward or away from the mouth 42 of the nozzle for the purpose of securing a vertical adjustment of the rotary brush 44 within the nozzle 40 of the cleaner, as is desirable under some circumstances, particularly after the brush bristles have become worn.

A belt 90 in driving relationship with a pulley 92 provided on the hub of the fan 48 and a pulley formed on the agitator 44 is operative for driving the latter during the operation of the motor and the fan. The spring 72 is provided with an offset portion 94 forming a shoulder or latch which is arranged to bear against the under side of the stub shaft 84 and to hold the same on its seat 82. The guide 80 is formed by a pair of ribs 96 and 98, the rib 98 being partially relieved below the seat 82 so as to accommodate the shoulder 94 of the spring 72 and enable it to bear against the under side of the stub shaft 84. The spring 72 thus also forms a latch for the agitator.

The springs 72 may be sufficiently flexible so that the stub shafts 84 at each end of the agitator may be pressed into their seats 82 even when the bottom plate 56 is in place, although it will be apparent that in order to remove the agitator 44 from the nozzle 40, it will be necessary to remove the bottom plate 56 so as to free the ends 70 of the springs 72 in order to permit the springs 72 to yield sufficiently for the stub shafts 84 to pass the shoulders 94. The ends 70 of the springs are formed so as to bias the front end 60 of the bottom plate 56 upwardly so that when the bottom plate 56 is in position the displacement of the ends 70 of the springs 72 will cause the shoulders 94 to react against the stub shafts 84 sufficiently so as to firmly hold the stub shafts 84 in their seats during operation of the agitator 44.

Figure 8:
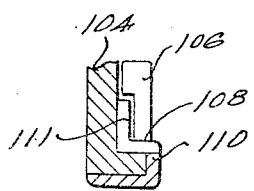
Fig. 8 is a sectional view taken along the line 8—8 of Fig. 6.
Figure 9:
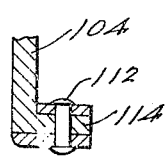
Fig. 9 is a sectional view taken along the line 9—9 of Fig. 6.

In the modification shown on sheet 2, the forward end 100 of the bottom plate 102 is shaped somewhat differently than that illustrated in Figs. 2 and 3, the bottom plate 102 in the construction illustrated on Sheet 2 projecting laterally beyond the side walls 104 of the nozzle at the rear thereof and being provided with forwardly extending lugs 106, each of which lugs 106 rests upon a seat 108 formed on one end of an agitator latch 110, as shown in Fig. 8. The agitator latch 110 is channel shaped in cross section and is pivoted at 112 by a pin to the side lip 114 of the nozzle mouth, the lip 114 being formed so as to be received within the channel shaped part of the latch 110 and so that the latch 110 when closed in effect forms a continuation of the lip 114.

The latch 110, when closed, extends across the lower end of a guide 116 formed on the inside of the side wall 104 of the nozzle, it being understood that each inside wall of the nozzle is provided with the same construction. The guide 116, as illustrated in Fig. 4, is in the form of a generally rectangular shaped recess which may be formed by the side wall 104 of the nozzle and above the mouth thereof. Each guide 116 is adapted to accommodate a thread guard 118 which is generally rectangular in shape. The side walls of the guide 116, however, may be provided with a slight taper which makes the lower end of the guide 116 slightly wider than the upper end thereof, and the upper and lower halves of the thread guards 118 at the sides thereof may be slightly tapered so as to snugly fit within the upper part only of the guide 116. The thread guard 118 is stationarily positioned in the guide 116 and is formed with an annular pocket 120 in which the end of the cylindrical agitator body 122 is received.

A felt washer 124 may be arranged between the end of the body 122 and the adjacent wall of the thread guard. A central portion of the thread guard is offset to form an annular boss 126 having a hole therein through which the threaded end 128 of the stationary agitator shaft 130 extends. A nut 132 is threaded on the threaded end 128 of the agitator shaft 130 for holding the thread guard 118 assembled to the agitator.

A fiber gasket or washer 134 may be arranged between the center boss 126 of the thread guard and a sleeve bearing 136 which is arranged in a socket 138 in the end of the agitator body 122 and which is journaled on the shaft 130 for rotatably supporting the agitator body 122 on the shaft 130. While only one end of the nozzle and agitator have been illustrated, it will be understood that the other end embodies the same construction. This is true in connection with the modification illustrated on Sheet 2, as well as the other modifications illustrated.

The axis of the shaft 130 is positioned off center vertically relative to the center of the thread guard 118 so that when the agitator and thread guard assembly has been removed from the guide 116 and the thread guard shifted 180° relative to the axis of the shaft 130 and thereafter reinserted in the guide 116, the agitator body 122 will be positioned closer to the nozzle mouth than it is as illustrated in Fig. 4. This is provided so as to obtain adjustment of the agitator in the nozzle to compensate for wear of the brush bristles.

Figure 6:
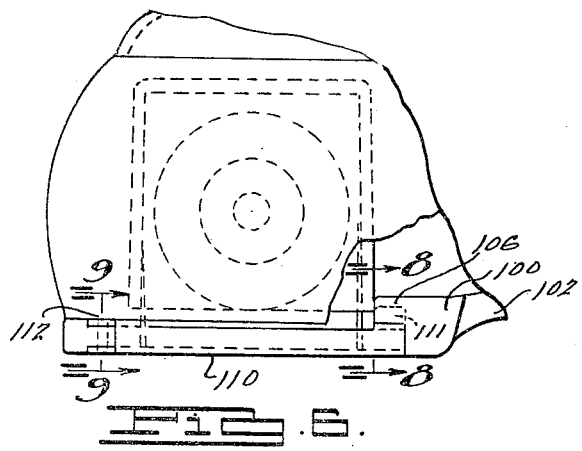
Fig. 6 is a side elevational view of that part of the nozzle illustrated in Fig. 4, but taken from the opposite side of the cleaner.
Figure 7:
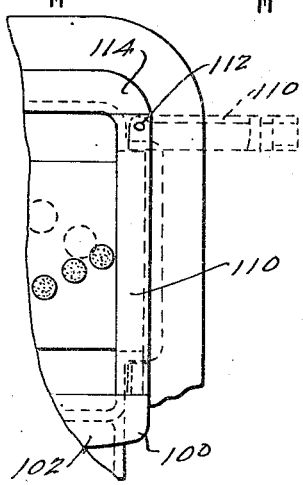
Fig. 7 is a fragmentary bottom plan view taken along the line 7—7 of Fig. 5.

It will thus be observed that when the bottom plate 102 is removed in a manner similar to that as described in connection with Figs. 2 and 3, the latches 110 may be swung about their pivots 112 so as to expose the open or lower end of the guide 116, thereby making it possible to remove the agitator from the nozzle by sliding the thread guards 118 out of their guides 116. It should be noted that, as illustrated in Figs. 6 and 8, the swinging end of the latch 110 is provided with a part 111 which is positioned between the nozzle side wall 104 and the lugs 106 of the bottom plate 102 when the bottom plate is in its position and the latches 110 in their closed position. The latches 110 may be formed with a spring action so as to bias the thread guards 118 firmly in the guides 116.

Figure 10:
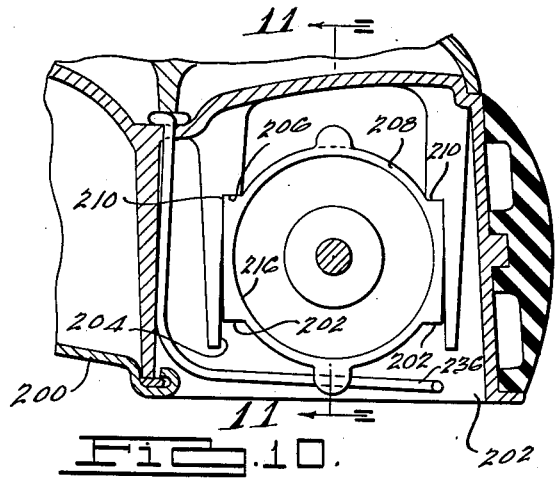
Fig. 10 is a view similar to Fig. 2 but illustrating a further modified form of the invention and taken along the line 10—10 of Fig. 11.
Figure 11:
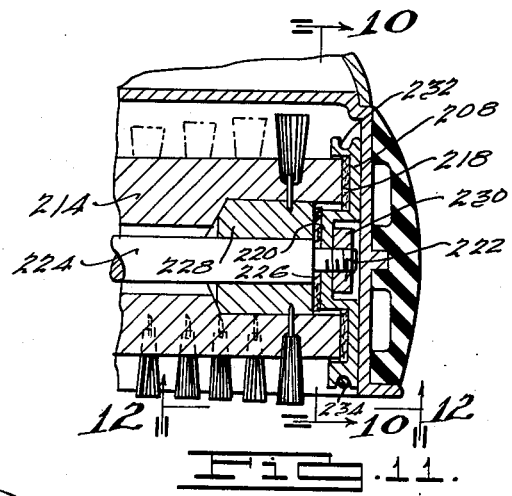
Fig. 11 is a sectional view taken along the line 11—11 of Fig. 10.
Figure 12:
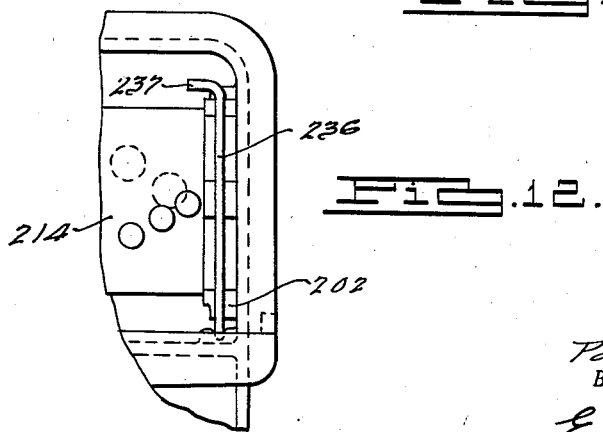
Fig. 12 is a bottom plan view taken along the line 12—12 of Fig. 11.

In the modification as disclosed in Figs. 10, 11 and 12 on Sheet 3, the bottom plate 200 is secured in position independently of the agitator latch. Each side wall of the nozzle is provided with a guide 204 and a pair of shoulders 206 forming a seat for receiving and seating the thread guard 208, the thread guard being provided with suitable pairs of shoulders 210 and 202 on opposite sides thereof so that the agitator 214 may be positioned in either of two positions in the nozzle and relative to the mouth thereof.

The thread guard 208 is very similar to that illustrated in the modification shown on Sheet 2 and includes an annular recess 216 for receiving the end of the body of the agitator 214. A felt washer 218 is positioned between the end of the agitator body and the bottom of the recess 216. The thread guard 208 further includes an apertured central boss 220 through which the threaded end 222 of the agitator shaft 224 extends. A fiber washer 226 is arranged between the central boss 220 and a sleeve bearing 228 which is journaled on the shaft 224 and seated in a socket in the end of the agitator body 214 for rotatably supporting such end of the agitator on the shaft 224. A nut 230 secured on the threaded end 222 of the shaft 224 secures the thread guard 208 in assembled position on the end of the agitator 214.

The thread guard at its upper and lower ends is provided with grooves 232 and 234 for receiving a spring 236 which functions as an agitator latch for removably holding the thread guard 208 on its seat. The spring 236 may be in the form of an L and be rotatably secured in a hole provided in the top wall of the nozzle. Thus, by pressing downwardly on the free end 237 of the spring 236 and shifting it in a counterclockwise direction (Fig. 12) it may be separated from the thread guard 208 and moved out of the path of the agitator 214 so as to permit the same with its thread guards to be removed from the nozzle.

In the embodiment illustrated on Sheet 4, the front end 300 of the bottom plate 302 at each side thereof is provided with lugs 304 which latch over the tops of the outwardly projecting ends 306 of the nozzle lips 308 at the sides of the nozzle for retaining the front end of the bottom plate 302 in position, the rear end being secured as illustrated in Fig. 2.

An agitator latch and belt guard member 310 (Fig. 16) is pivotally secured at 312 to the forward end 314 of the bottom plate which defines the rear lip of the nozzle mouth. The member 310 includes two arms 316, one at each side of the nozzle, and a U-shaped central portion 318 which is adapted to function as a belt guard when the parts are positioned as illustrated in Fig. 15.

The member 310 is pivotally secured to the forward end of the bottom plate 302 and adapted to be pivoted relative thereto. After the rear end of the bottom plate 302 is released and the lugs 304 at the front end of the bottom plate separated from their retaining means, the member 310 may be disengaged from the nozzle by disengaging the hooks 320 at the forward ends of the arms 316 from the notches or keepers with which the hooks 320 are engaged, as illustrated in Figs. 13 and 14.

The forward end of the belt guard 318 is adapted to be positioned in a recess formed in the front lip 322 of the nozzle so that the lower side of the member 310 at the front is substantially flush with the surface of the lip 322.

The arms 316 form latches for securing the agitator or rotary brush 324 in the nozzle. The inside walls at the sides of the nozzle are each provided with a guide 326, substantially the same kind as illustrated in the modification shown on Sheet 3, for receiving the thread guards 328 secured to the ends of the agitator 324. The arms 316 cooperate with grooves 330 formed on the thread guard for retaining the same in position in the guide 326 for operatively retaining the agitator 324 in the nozzle. The construction of the thread guard and the agitator and its bearing are the same as illustrated in Figs. 10, 11 and 12, so the description of the same need not be repeated here.

In the modification illustrated on Sheet 5, the agitator, thread guard, and bearing for the agitator are constructed substantially the same as illustrated in the modifications shown on Sheets 3 and 4. The bottom plate 402 is secured in position in the same manner as shown in Fig. 15, but the agitator latch and belt guard member 404 is not pivoted thereto, as shown in the previous modification, but rather is pivoted at 406 to the front lip 408 of the nozzle. The member 404 includes a belt guard 410 and a pair of spring arms or members 412, one for each end of the nozzle, each of which is cooperable with a thread guard 414 for retaining the same in position in their guides.

Figure 18:
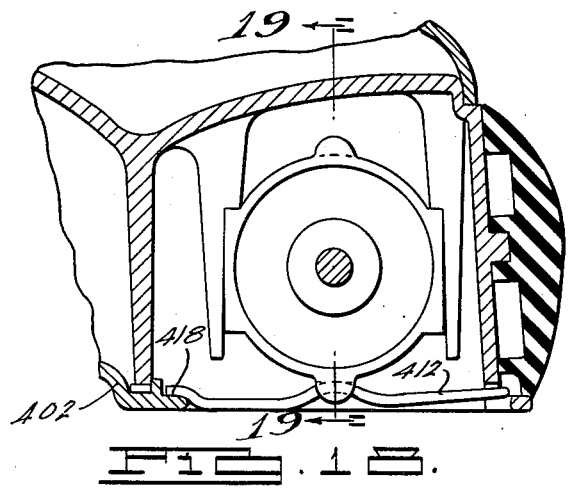
Fig. 18 is a fragmentary sectional view similar to Fig. 2 but illustrating a modified form of the invention, taken along the line 18—18 of Fig. 19.
Figure 20:
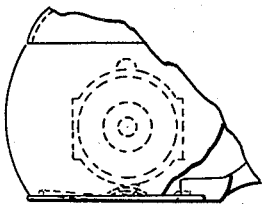
Fig. 20 is a fragmentary side elevational view of the nozzle, looking in the direction of the arrow 20 in Fig. 19.
Figure 19:
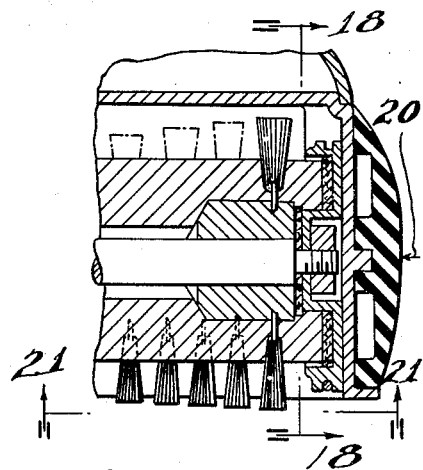
Fig. 19 is a sectional view taken along the line 19—19 of Fig. 18.
Figure 21:
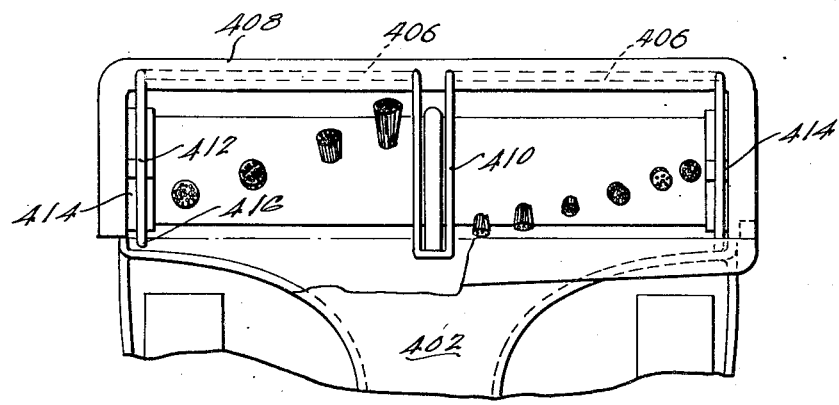
Fig. 21 is a bottom plan view taken along the line 21—21 of Fig. 19.
Figure 22:
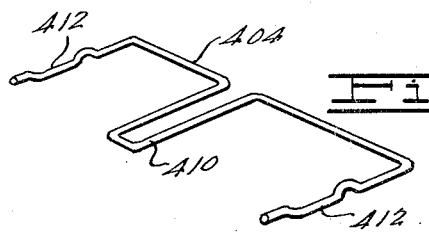
Fig. 22 is a perspective view of the agitator latch and belt guard.

The front lip 408 of the nozzle is provided with several holes through which the arms 412 on the belt guard 410 extend and which permit a pivotal movement of the same. The rear ends 416 of the arms 412 are retained in position by a shoulder 418 formed by the forward end of the bottom plate 402 on the upper side thereof. Thus, after the bottom plate 402 is removed, the arms 412 may be pivoted in a counterclockwise direction (Fig. 18) so as to release the thread guards and thereby make possible the removal of the same from their guides. The member 404, as well as the member 310 of the previous modification, preferably is formed of spring wire and is so formed as to firmly hold the thread guards in their guides.

While I have illustrated and described preferred embodiments of my invention, it is understood that these are capable of modification, and I therefore do not wish to be limited to the precise details set forth but desire to avail myself of such changes and alterations which fall within the purview of the following claims.

I claim:

1. In a suction cleaner having a nozzle and a fan chamber, with a passage interconnecting the same, a readily removable bottom plate defining the bottom wall of said passage and the rear lip of said nozzle, and a rotary agitator operatively arranged in said nozzle, said agitator being provided at its ends with stationary thread guards; said nozzle having closed ends, the insides of which are provided with aligned U-shaped guides providing seats for receiving and seating said thread guards, and a pair of spring members, one for each end of said nozzle, each spring member having one of its ends reacting against a part of said nozzle, and a part thereof reacting against one of said thread guards, said bottom plate having a portion thereof against which the other ends of said spring members react for maintaining said spring members in operative position for biasing and securing said thread guards in position on said seats so that upon removal of said bottom plate said agitator may be readily removed from said nozzle.

2. In a suction cleaner having a nozzle and a fan chamber, with a passage interconnecting the same, a removable bottom plate defining the bottom wall of said passage and the rear lip of said nozzle, and a rotary agitator operatively arranged in said nozzle, said agitator being provided at its ends with stationary thread guards; said nozzle being provided with aligned guides forming seats for receiving and seating said thread guards, and a pair of members, one for each end of said nozzle, each of said members having one of its ends pivoted to a part of said nozzle, and a portion thereof extending across one of said guides for maintaining a thread guard therein, said bottom plate having portions thereof with which the other ends of said members are engageable for maintaining said members in position across said guides for holding said guards in said seats.

3. In a suction cleaner having a nozzle and a fan chamber, with a passage interconnecting the same, a removable plate defining at least part of the bottom wall of said passage, and a rotary agitator operatively arranged in said nozzle, said agitator being provided at its ends with stationary holders on which said agitator is rotatably mounted, said nozzle being provided with aligned guides forming seats for receiving and seating said holders, and a pair of members, one for each end of said nozzle, each of said members having one of its ends pivoted to a part of said nozzle, and a portion thereof extending across one of said guides for maintaining said holder therein, said plate having portions thereof with which the other ends of said members may be engaged for maintaining said members in position across said guides for holding said holders in said seats.

4. In a suction cleaner having a nozzle and a rotary agitator operatively arranged in said nozzle, said agitator being provided at its ends with stationary thread guards; said nozzle having closed ends, the insides of which are provided with aligned guides forming seats for receiving and seating said thread guards, said thread guards having a downwardly facing groove on the under side thereof, and spring means including a pair of spring members, one at each end of said nozzle, each spring member having one of its ends reacting against a part of said nozzle, and a portion normally extending horizontally across said guide and located in said thread guard groove to bias and maintain said thread guard on its seat, said spring members being detachable from said grooves by downward movement of said horizontally extending portions of said spring members relative to said thread guards.

5. In a suction cleaner having a nozzle and a fan chamber, with a passage interconnecting the same, a removable bottom plate defining the bottom wall of said passage and the rear lip of said nozzle, and a rotary agitator operatively arranged in said nozzle, said agitator being provided at its ends with stationary thread guards; said nozzle being provided with aligned guides forming seats for receiving and seating said thread guards, and a spring member having one of its ends pivotally connected to the front lip of said nozzle and having portions extending rearwardly, said bottom plate cooperating with said rearwardly extending portions to position said spring member beneath said guides, said rearwardly extending portions cooperating with said thread guards for maintaining the same on said seats in said guides.

6. In a suction cleaner having a nozzle and a fan chamber, with a passage interconnecting the same, a removable bottom plate defining the bottom wall of said passage and the rear lip of said nozzle, and a rotary agitator operatively arranged in said nozzle, said agitator being provided at its ends with stationary holders, a power driven belt drivingly engaged with said agitator; said nozzle being provided with aligned guides forming seats for receiving and seating said holders, and a spring member having one of its ends pivotally connected to the front lip of said nozzle and having portions extending rearwardly, the other end of said spring member being engageable with said bottom plate so as to position portions of said spring member across said guides, said portions of said spring members cooperating with said holders for maintaining the same on said seats in said guides, said spring member including another portion extending transversely of said nozzle below said belt and forming a guard therefor.

PAUL T. HAHN.

(References on following page)

REFERENCES CITED

The following references are of record in the file of this patent:

UNITED STATES PATENTS

| Number | Name | Date |
|---|---|---|
| 1,091,383 | Oblosser | Mar. 24, 1914 |
| 1,462,574 | Hoover | July 24, 1923 |
| 1,811,350 | Curry | June 23, 1931 |
| 1,995,630 | Bass | Mar. 26, 1935 |
| 1,999,696 | Kitto | Apr. 30, 1935 |
| 2,092,581 | Kitto | Sept. 7, 1937 |
| 2,099,172 | McCabe | Nov. 16, 1937 |
| 2,192,397 | Carlson | Mar. 5, 1940 |
| 2,202,788 | Allen | May 28, 1940 |
| 2,317,570 | White | Apr. 27, 1943 |
| 2,336,710 | Wied | Dec. 14, 1943 |

FOREIGN PATENTS

| Number | Country | Date |
|---|---|---|
| 264,444 | Great Britain | Apr. 14, 1927 |
| 364,362 | Great Britain | Jan. 7, 1932 |